United States Patent [19]
Patton et al.

[11] 3,775,182
[45] Nov. 27, 1973

[54] TUBULAR ELECTROCHEMICAL CELL WITH COILED ELECTRODES AND COMPRESSED CENTRAL SPINDLE

[75] Inventors: Jimmie Donald Patton; Klaus Guenther Wuttke, both of Wilmington, Del.

[73] Assignee: E. I. du Pont de Nemours and Company, Wilmington, Del.

[22] Filed: Feb. 25, 1972

[21] Appl. No.: 229,277

[52] U.S. Cl. ................................................. 136/13
[51] Int. Cl. ......................................... H01m 35/16
[58] Field of Search ............................... 136/13–14, 69, 107, 83, 134–135

[56] References Cited
UNITED STATES PATENTS

| | | |
|---|---|---|
| 2,807,658 | 9/1957 | Hatfield ........................... 136/107 |
| 3,156,585 | 11/1964 | Yamano et al. ...................... 136/6 |
| 3,245,837 | 4/1966 | Ikeda et al. ...................... 136/134 P |
| 3,355,329 | 11/1967 | Wilke et al. ..................... 136/134 P |
| 3,364,069 | 1/1968 | Deschamps ........................... 136/13 |
| 3,373,060 | 3/1968 | Gray .............................. 136/13 X |
| 3,503,806 | 3/1970 | Sugalski ............................ 136/13 |
| 3,510,353 | 5/1970 | McHenry ............................ 136/13 |

Primary Examiner—Anthony Skapars
Attorney—Francis J. Crowley

[57] ABSTRACT

Disclosed herein is a tubular electrochemical cell having electrolyte therein and having anode(s), cathode(s) with separator(s) therebetween all coiled around a central spindle, the cell having a cap which is compressively affixed thereto so that one terminal of the cell is in compressive contact with the electrically conductive area of the tubular casing and the other is in compressive contact with the electrically conductive area of the cap.

1 Claim, 8 Drawing Figures

FIG. 5
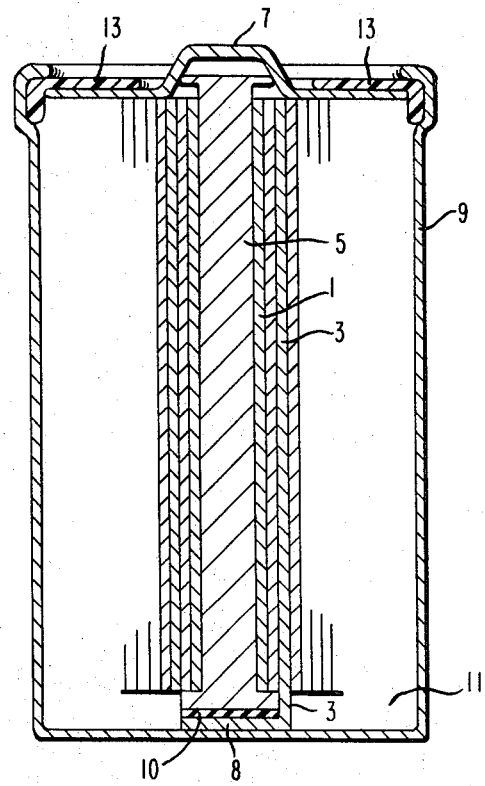
FIG. 6   FIG. 7   FIG. 8
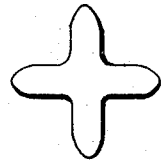 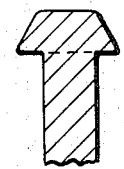 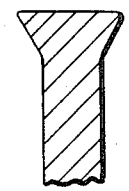

TUBULAR ELECTROCHEMICAL CELL WITH COILED ELECTRODES AND COMPRESSED CENTRAL SPINDLE

BACKGROUND OF THE INVENTION

1. Field of the Invention

This invention relates to a higher energy density electrochemical cell. More particularly, this invention relates to an electrochemical cell wherein electrical contact for either or both anode and cathode from inside to outside of the battery is effected by compressive contact.

2. Description of the Prior Art

Batteries for commercial use, which provide high surface availability in a small volume often make use of a "jelly-roll" or coiled strip cell. In such battery cells, the electrodes and separators are flexible and can be rolled together into a concentric coil.

Sugalski in U.S. Pat. No. 3,503,806, discloses a rechargeable battery of the spiral wound plate type. In the battery of this patent, the battery plates are connected to the terminal straps by multiple welds and the cap of the battery is secured to the casing by welding.

Deschamps in U.S. Pat. No. 3,364,069 also discloses cells with spirally wound electrodes, but, as in Sugalski above, the anode is connected to the casing by soldered wires. The welding or soldering operations by which the anodes and cathodes of such spirally wound cells are attached to the external contacts of the cells are, however, time-consuming and relatively expensive operations. Elimination of such welding or soldering steps is therefore highly desirable.

An electrochemical cell has now been discovered wherein electrical contact from inside to outside of the battery for either or both anode terminal and cathode terminal is accomplished by compressive contact.

SUMMARY OF THE INVENTION

The present invention is directed to an electrochemical cell comprising:
a. a generally tubular casing having an electrically conductive area and having one end closed by an integral end wall;
b. a central spindle longitudinally aligned within said casing, said spindle comprising
  i. a shaft, and
  ii. at least one broadened end which is in close proximity with and generally parallel with the integral end wall of said tubular casing;
c. a flexible layered coil wound about said spindle, said coil comprising
  i. an anode layer having a terminal,
  ii. a cathode layer having a terminal, and at least one
  iii. non-conductive separator layer which is situated therebetween; and
d. a cap means compressively affixed to said tubular casing defining a closure for the other end of said casing, said cap having an electrically conductive area and being electrically insulated from the conductive tubular casing; and
e. an electrolyte within said tubular casing; wherein when said cap means is compressively affixed in place, one terminal is in compressive contact with the electrically conductive area of the tubular casing, the other terminal is in compressive contact with the electrically conductive area of said cap means or one terminal is in compressive contact with the electrically conductive area of the tubular casing and the other terminal is in compressive contact with the electrically conductive area of said cap means.

DESCRIPTION OF THE DRAWINGS

FIG. 5 shows a third electrochemical cell in central vertical section.

FIG. 6 shows a top view of the central spindle top of the electrochemical cell of FIG. 5.

FIG. 7 shows the top portion of a central spindle in central vertical section.

FIG. 8 shows the top portion of another central spindle in central vertical section.

DESCRIPTION OF THE INVENTION

Figure 1:
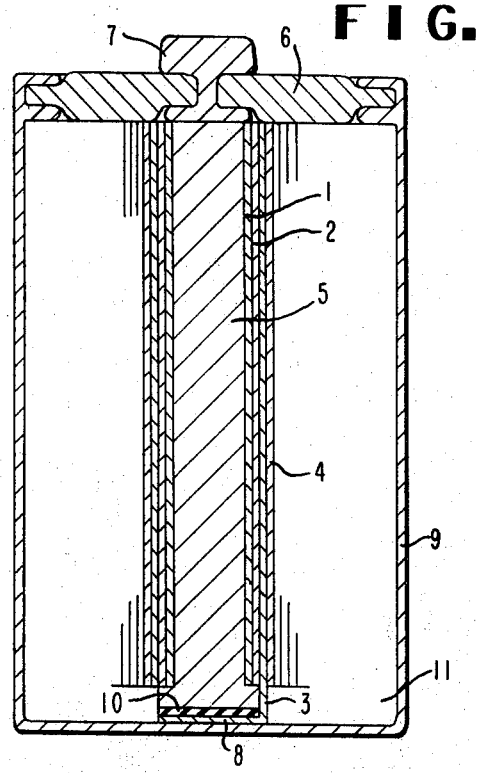
FIG. 1 shows an electrochemical cell in central vertical section.

High energy density electrochemical cells intended for commercial use require a form that makes the best use of the energy-rich materials employed by providing a high surface availability in a small volume. An effective way of accomplishing this objective is the use of the jelly-roll or coiled electrode cell.

In the electrochemical cells of this invention flexible anode, non-conductive separator and cathode are rolled into a concentric layered coil which is wound about a center spindle to form a central core of the cell.

The cell of this invention comprises:

a. a generally tubular casing having an electrically conductive area made of a conductive metal, preferably steel. By "generally tubular" is meant substantially tubular. One end of the tubular casing is closed by an integral end wall. The entire casing may be made of the conductive metal or a portion of it may be made of a non-conductive material such as an organic polymer, so long as it has at least a conductive contact portion or area which will allow electrical contact from inside to outside of the cell.

b. a spindle which is usually made of a conductive metal, preferably steel. This central spindle may, however, as will be seen in a more detailed discussion of the Figures herein, be made of a non-conductive polymer material such as nylon. The spindle has a shaft which shaft has at least one broadened end. This broadened end may be generally flat and perpendicular to the shaft, cup shaped or the like; the purpose of the broadened end being to distribute the compression force which will be discussed subsequently. The exact shape or degree of broadening is therefore not critical. The spindle is centrally located inside the tubular casing of (a), the shaft of said spindle being generally aligned with the longitudinal axis of the casing and the broadened end of said shaft being in close proximity with and generally parallel with the integral end wall of said tubular casing. By the term "generally parallel" as used herein is meant substantially parallel. While the broadened end of the shaft is in close proximity with the integral end wall of the casing, it does not directly contact said end wall.

c. a flexible layered coil which is wound about the spindle of (b) to form the central core of the cell. The coil has at least three layers; a flexible anode layer, a flexible cathode layer and at least one non-conductive separator layer which is situated between said cathode and anode layers. Additional non-conductive separator layers may, however, be present. For example, if the entire tubular casing is conductive, a separator layer may be found between the outer conductive layers of the layered coil and the conductive tubular side walls.

The flexible anode layer is usually a flat strip of lithium, sodium or other active metal impressed into a conductive metallic screen. Lithium is the preferred material of construction for the anode layer.

The flexible cathode layer is usually a flat strip of an electrochemically active material such as a halide, oxide or sulfide of lead, mercury, cadmium, silver, copper, nickle, iron or manganese, which is impressed into a conductive metallic screen. In addition to the aforementioned cathode materials, sulfur, silver chromate and vanadium pentoxide may also be used. The preferred cathode materials are, however, copper sulfide and iron sulfide.

The material of construction of the non-conductive separator layer is not critical, so long as it provides effective electrical insulation, e.g., between anode and cathode layers. Paper and cloth are useful materials for the separator but a non-woven synthetic textile material such as polypropylene is preferred.

d. a cap means is used to close the end of the tubular casing opposite the integral end wall. As was true of the tubular casing, the entire cap means may be made of conductive metal, preferably steel, or a portion of it may be made of a non-conductive material such as an organic polymer so long as it has at least a conductive contact portion or area which will allow electrical contact from inside to outside of the cell.

The cell is sealed by compressively securing the cap means to the edge of the open end of the tubular casing, i.e., when the cap is affixed in place sealing the cell, a compressive force is exerted upon it which compressive force is capable of being transmitted through the center spindle. The conductive area of the tubular casing must however not contact the conductive area of the cap means. Therefore, when both the cap means and the tubular casing are entirely made of conductive materials, a non-conductive insulating ring or gasket must be placed therebetween and the cell is then sealed by compressively securing the cap means to the edge of the open end of the tubular casing through the non-conductive ring.

e. high energy density batteries require in addition to an anode and a cathode a nonaqueous electrolyte which is inserted into the tubular casing before it is sealed by the cap means.

Any electrolyte recognized as useful in the art may be employed, however, preferred electrolytes include i. an electrolyte comprising a conductive salt having the formula $M(ClO_4)_x$ or $M(M'F_6)_x$ where M is one of the light metal cations, $x$ is the valence of M and M' is P, As or Sb and a solvent consisting essentially of a dialkyl carbonate or a mixture of the dialkyl carbonate and a secondary solvent such as diethyl ether;

ii. an electrolyte comprising trihydrocarbyl carbamate as solvent and up to about 30% by weight of a conductive salt, having the formula $MM'F_6$ where M is Li, Na or K and M' is P, As or Sb, dissolved therein, wherein optionally up to about 40% by weight of the solvent can be comprised of a secondary solvent, having the formula $R^3O+CH(R^4)CH_2O+_nR^3$ in which $R^3$ is a $C_1$ to $C_3$ alkyl group, $R^4$ is hydrogen or a methyl group and $n$ is 0–2; and iii. electrolytes comprising dioxolane as solvent and up to about 20 weight percent of a conductive salt such as $LiClO_4$ dissolved therein, wherein optionally up to 50 weight percent of the solvent can be a second solvent which is an aliphatic or cycloaliphatic carbohydric ether.

The layered coil in the cell of this invention is so constructed and is wound about the spindle in such a way as to allow that when the cap means is compressively affixed in place, the conductive area of the cap means makes compressive electrical contact with either the cathode terminal or the anode terminal and the other terminal makes a compressive electrical contact with the conductive area of the tubular casing. This can be more readily understood by reference to the accompanying Figures which show specific embodiments of the electrochemical cell of this invention.

Figure 3:
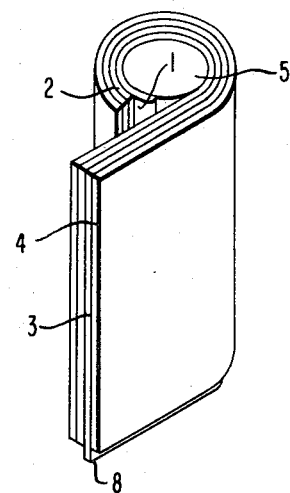
FIG. 3 shows a perspective view of a partially wound flexible layered coil of the electrochemical cell of FIG. 1.

FIG. 1 is a central vertical section of an assembled electrochemical cell of this invention wherein electrical contact from inside to outside of the battery for both anode and cathode is accomplished by compressive contact rather than by welding contact. In this particular cell electrical contact is made between the cathode layer (1) and the conductive area of the cap means (7) through a conductive spindle (5). One end of the cathode layer (1) extends horizontally beyond the other layers of the coil as shown in FIG. 3 and this extended end of the cathode layer constitutes a cathode terminal which is affixed longitudinally to the shaft of the conductive spindle (5). When the cap means (6) is compressively affixed in place to seal the cell (in this embodiment by crimping over the edge of the tubular casing (9)), the conductive area of said cap means (7) is compressed sufficiently to contact the top of conductive spindle (5) thereby providing electrical contact from cathode (1) inside the cell through spindle (5) to the conductive area of the cap means (7) outside the cell. In this embodiment the anode layer (3) of the coil has a tab (8) thereon which tab functions as an anode terminal and extends vertically below the other layers of the coil as shown in FIG. 3. This tab (8) is extended between the broadened (in this embodiment flat) end of the spindle (5) and the conductive tubular casing (9). Since in this particular embodiment, the spindle is conductive, a non-conductive spacer (10) is placed between the flat end of the conductive spindle (5) and the anode tab (8) to electrically insulate one from the other. This spacer may be made of any non-conductive material, a non-conductive, non-woven synthetic textile material such as polypropylene being preferred. When the cap means (6) is compressively affixed in place, the spindle (5) in contact therewith is likewise compressed and this compressive force is transmitted through the spindle (5) which is in contact therewith and this in turn forces or effects the compressive contact of anode tab (8) against the conductive casing (9). Electrical contact is thus provided from anode (3) inside the cell to the conductive tubular casing (9) outside the cell. Electrical contact with both anode and cathode is thus effected by compressive contact without a need for costly and time-consuming weld contacting. Non-conductive separator layers appear as (2) and (4) in FIGS. 1 and 3. Electrolyte in these Figures appears as (11).

It is understood, of course, that in this embodiment, as well as all other embodiments of this invention, the position of the anode and cathode layers may be reversed, thus allowing compressive electrical contact with the anode terminal to the conductive area of cap means (7) and compressive electrical contact with the cathode terminal to the conductive tubular casing (9).

Figure 2:
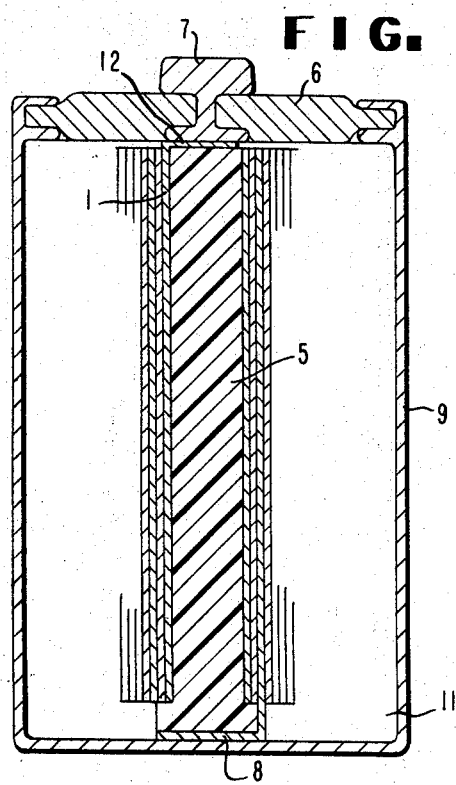
FIG. 2 shows a second electrochemical cell in central vertical section.
Figure 4:
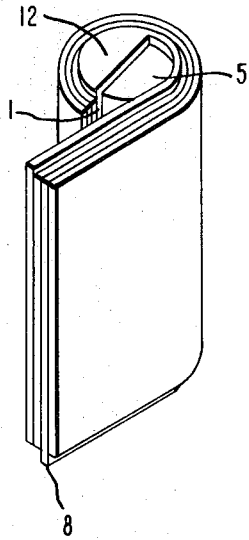
FIG. 4 shows a perspective view of a partially wound flexible layered coil of the electrochemical cell of FIG. 2.

FIG. 2 is a central vertical section of another assembled electrochemical cell of this invention. In this embodiment the center spindle (5) is non-conductive and in order to establish electrical contact from the cathode (1) inside the cell to the outside of the cell, the cathode layer (1) of the coil has a tab (12) thereon which tab extends vertically above the other layers of the coil as shown in FIG. 4. This tab (12) is extended between the top end of the spindle (5) and the conductive area of the cap means (7). When the cap means (6) is compressively affixed in place to seal the cell, the conductive area of cap means (7) is compressed sufficiently to directly contact the cathode tab (12) thereby providing electrical contact from cathode (1) inside the cell to the conductive area of the cap means (7) outside the cell. Since spindle (5) is non-conductive in this embodiment, there is no need for a non-conductive spacer between the flat end of spindle (5) and the anode tab (8) which functions in the same manner as described in reference to FIG. 1.

FIG. 5 is a central vertical section of still another assembled electrochemical cell of this invention. In this embodiment the spindle (5) is conductive and therefore electrical contact with both cathode (1) and anode (3) is affected as in FIG. 1. In this Figure, however, the cap means rather than having a limited conductive area as in FIGS. 1 and 2, is entirely made of conductive material. Since the casing (9) is likewise conductive it is necessary in this embodiment to insert a non-conductive ring or gasket (13) between the crimped edge of conductive casing (9) and the conductive cap. This does not affect the compression which results when the cap means is affixed in place. It will be noted that the top of spindle (5) differs in FIG. 5 from the tops of the spindles of FIGS. 1 and 2. This may be done, as will occur to one skilled in the art, to vary both the contact area and the compressive force between cap means and spindle which will result when the cap means (6) is compressively affixed in place.

FIG. 6 is a top view of the top of the spindle of FIG. 5.

FIGS. 7 and 8 are vertical sections of other useful spindle tops.

Should it be desirable for any reason, the compressive electrical contact of either the anode or cathode can be eliminated and replaced by known means of electrical contact such as welding. But, in each embodiment of this invention either one terminal (anode or cathode) is in compressive contact with the electrically conductive area of the tubular casing, or the other terminal (cathode or anode) is in compressive contact with the electrically conductive area of the cap means, or both.

A cell of this invention may be assembled in various ways which can be readily determined by those skilled in the art. For example, in the cell of FIG. 5 both ends of the spindle (5) could be inserted in chucks, and the assembly of separator-anode-separator-cathode-separator prepared. One or both chucks could then be rotated to rotate the spindle after the cathode layer (1) has been affixed to the spindle. After rolling is completed, the spindle would be released from the chucks and the anode tab (8) folded over the insulating disc (10) at the broadened end of the spindle. The coil wound around the spindle is then inserted into the casing (9) and the prepared electrolyte (11) is charged in. The cap means with its insulating ring (13) is put into place and the shoulder of the casing is crimped around the top. In this crimp the cap means seats firmly on its locating shoulder which forces it down on the spindle. The top of the spindle makes electrical contact with the cap means, and the broadened end of the spindle presses the anode tab into contact with the casing. Alternatively, the coil could, for example, be wound on a mandrel, then removed and a spindle inserted into the hole left by the mandrel.

The foregoing detailed description and drawings have been given for clarity of understanding only and no unnecessary limitations are to be understood therefrom. The invention is not limited to exact details shown and described for obvious modifications will occur to one skilled in the art.

We claim:

1. An electrochemical cell comprising:
   a. a generally tubular casing having an electrically conductive area and having one end closed by an integral end wall;
   b. a central spindle longitudinally aligned within said casing, said spindle comprising
      i. a shaft having
      ii. at least one broadened end which is substantially parallel to the integral end wall of said tubular casing and in contact with an anode terminal or cathode terminal; and,
   c. a flexible layered coil wound about said spindle, said coil comprising
      i. an anode layer having a terminal,
      ii. a cathode layer having a terminal, and at least one
      iii. non-conductive separator layer which is situated therebetween; and
   d. a cap means compressively affixed to said tubular casing defining a closure for the other end of said casing, said cap having an electrically conductive area in contact with an anode terminal or cathode terminal and being electrically insulated from the conductive tubular casing; and
   e. an electrolyte within said tubular casing; wherein when said cap means is compressively affixed in place, one terminal is in compressive contact with the electrically conductive area of the tubular casing and the other terminal is in compressive contact with the electrically conductive area of said cap means, said compressive contact being effected by the compression of said central spindle between said cap means and terminal and said integral end wall and terminal.

* * * * *